United States Patent Office 3,074,375
Patented Jan. 22, 1963

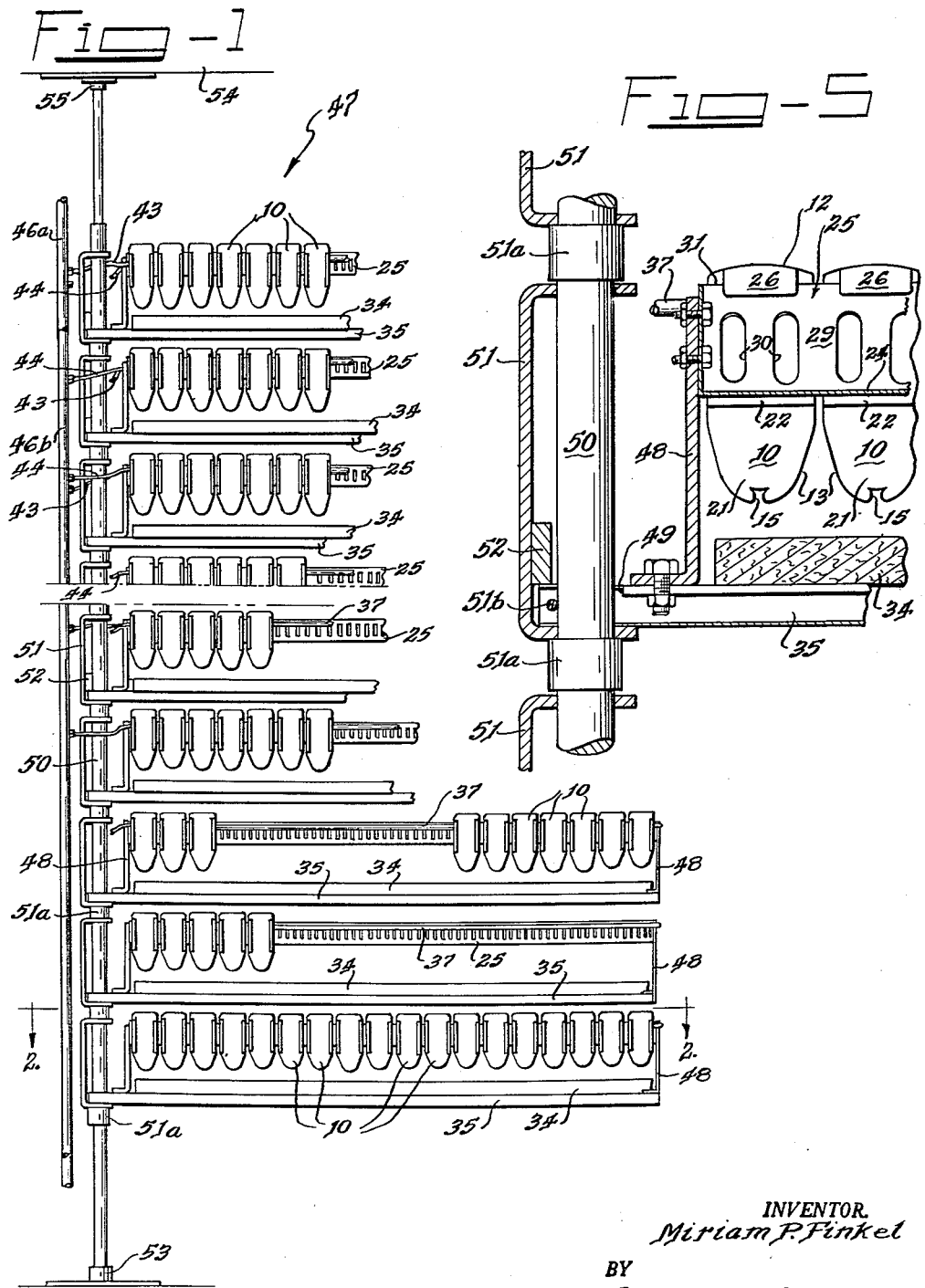

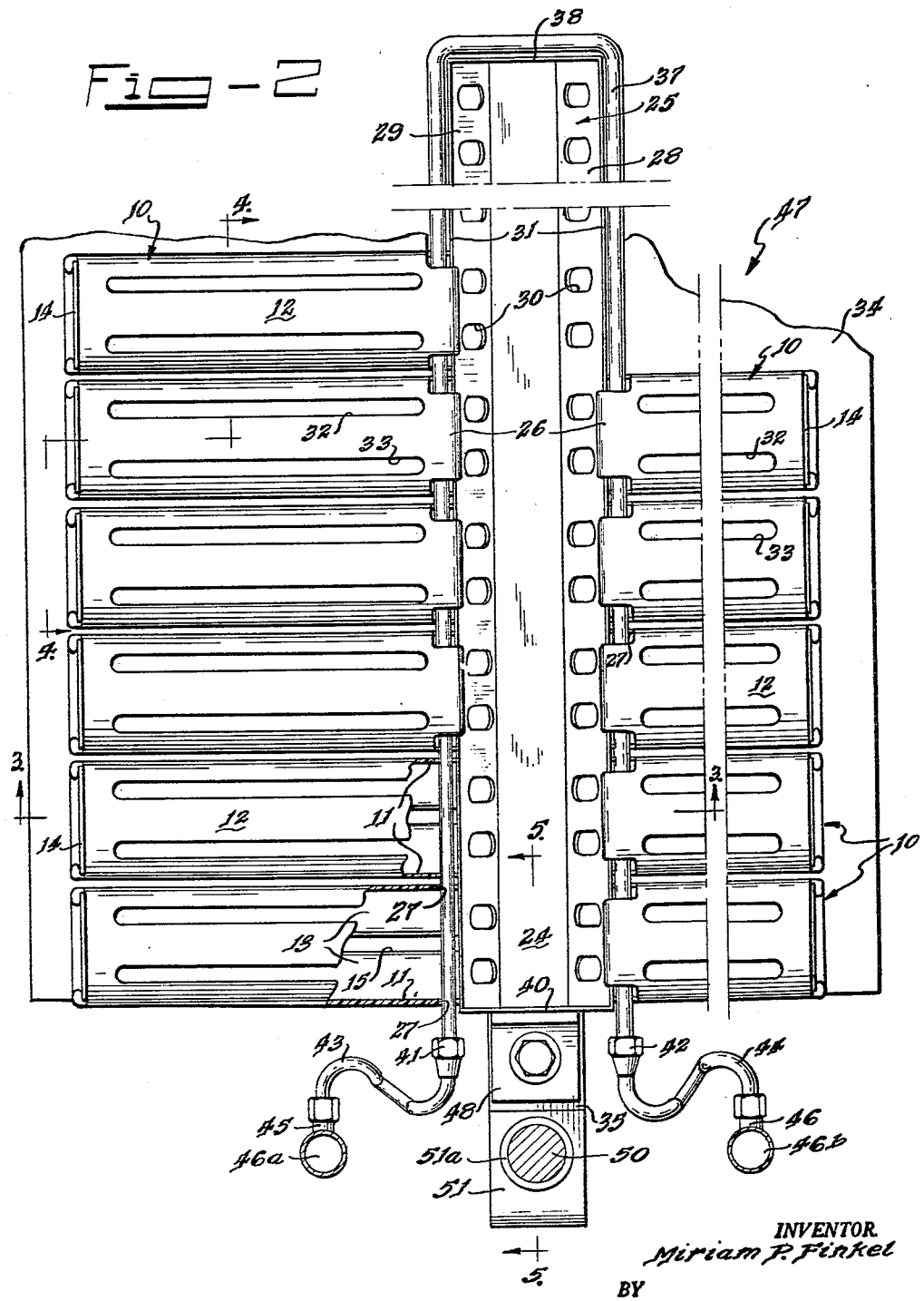

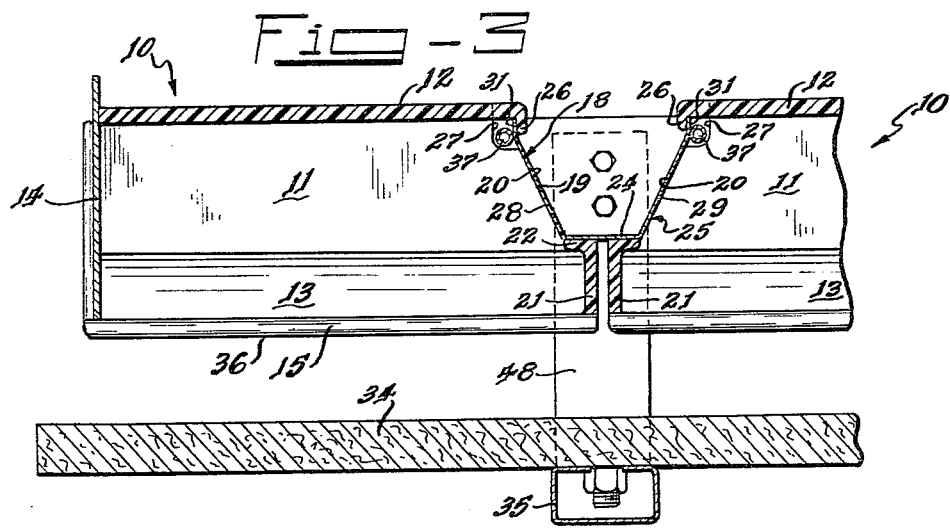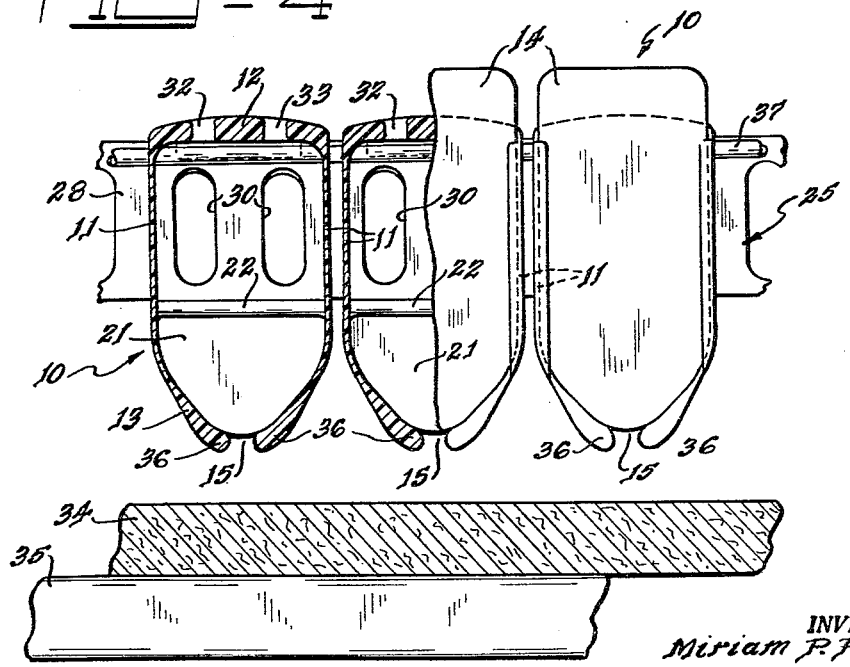

---

3,074,375
EXPERIMENTAL ANIMAL MAINTENANCE
Miriam P. Finkel, Chicago, Ill., assignor to the United States of America as represented by the United States Atomic Energy Commission
Filed Jan. 24, 1961, Ser. No. 84,739
3 Claims. (Cl. 119—18)

The invention relates to a novel apparatus and method for maintenance of small experimental animals such as mice, rats, hamsters, guinea pigs or the like, and more particularly, to such an apparatus for use in large laboratories requiring thousands, or even hundreds of thousands of such animals.

Present methods of maintaining experimental animals are unsatisfactory for several reasons. Due to the large number of animals that must be kept in biological, biochemical and pharmaceutical laboratories, it is not deemed feasible to house them in individual cages because of the labor costs of feeding, watering and litter changing, the latter being necessary twice a week in the usual case. For this reason, with few exceptions, the animals are kept in cages holding at least ten individuals, and experiments on feeding, drug effects, radiation effects and the like are run using such groups.

Group handling of the animals has serious drawbacks. Cannibalism sometimes breaks out, and more commonly tail chewing, hair pulling and the like; certain cages are characterized by a general restlessness due to the presence of an overly aggressive individual animal who disturbs the others at feeding and sleeping, and thereby affects the results of the experiment seriously. It is not practical to remedy these situations by removing the offending individual for two reasons; the individual cannot be identified without an unduly long time for observation of the cage, and even if he is identified and removed, the animals left in the cage become disturbed for several days as fights occur among them to re-establish the "social order."

In view of the foregoing, housing of experimental animals in individual cages has been suggested from time to time, but no economically feasible method has been devised for doing this on the scale required in large laboratories. Attempts have been made to house animals in small tube-like spaces made out of metal, but the animals grew panicky in these and either escaped or died of fright or exhaustion brought on by their efforts to escape. For this reason it was believed that animals had to be housed in groups, or if not, in sufficiently large spaces to move about freely. It was also considered essential that animals in single cages be in sight of other animals, and for this reason the single cages were always made of a transparent material such as wire mesh or glass. Gnawing is another problem that arises when individual cages are used; attempts to house animals individually in aluminum cages, for example, were given up when it was found that they gnawed through the metal.

Another reason that individual housing has not been used except in a limited number of cases is the difficulty and expense of feeding and watering. Each cage has to have an individual feed hopper and a water bottle with a shut-off type of nipple similar to a radiator filling hose used in automobile service stations. In a typical experimental animal room housing around 2500 animals in cages containing, on the average, 15 individuals, this means about 166 hoppers and bottles have to be refilled daily. The reliability of experimental results is seriously affected by any interruption of food and water supply, not only because of the lack of nutrients, but even more important, because it produces social unrest and even panic within the cage. Employing reliable experimental animal handlers is difficult enough under present conditions, so that multiplying the number needed by 15, which would be necessary if individual animal housing were to be adopted using present feeding and watering methods, is obviously unfeasible.

Individual housing on a large scale being given up because of its excessive labor requirements, the only method used for overcoming the adverse effects on experiments due to group housing of animals has been a "statistical" one; more plainly, this means that the testing is done on so many animals that the variables arising from the presence of unusual individuals of the kind mentioned become "cancelled out" by sheer numbers. This is obviously expensive, and it can therefore be seen that an important economy would result from individual housing, in that the number of animals required to get accurate results in an experiment would be smaller. If this could be done without unduly raising the cost of housing the animals individually, overall laboratory expenses would be reduced. Of course, it would be still better if the housing cost itself could be reduced at the same time.

It is, accordingly, an object of the invention to provide a method for housing experimental animals individually which will be of sufficiently low cost to justify its use in experiments with a reduced number of animals, compared to the cost of experiments using a larger number of animals which is necessary when methods of group housing are used.

It is a further object to provide a method of housing experimental animals individually which will be itself more economical than the methods of group housing now in use.

It is a further object of the invention to provide economical methods for feeding and watering individually housed experimental animals which will be dependable and yet not make excessive requirements for labor.

It is a further object of the invention to provide an apparatus by which the foregoing objects may be carried out.

All the foregoing objects are attained by a number of related discoveries which I have made. The first of these is that experimental animals do not become panicky when closely housed in plastic, even if the plastic is not transparent but merely translucent. Whether this is due to the fact that they are content to see each other's shadows moving through the plastic, or to the warmth of plastic as compared to metal, or to its greater quietness, has not been conclusively determined; in any event I have demonstrated by actual experimentation that they thrive and appear perfectly contented when housed in a translucent plastic such as polypropylene within a space of approximately twice their overall body dimensions, disregarding the length of the tail; in the case of mice, a space of about two by three by seven inches is adequate. This is with no outside view other than into a feed hopper at one of the small ends and longitudinal slots in the floor and top which will be described in more detail later on. Larger animals, of course, require larger space, but the same principle holds good.

My second discovery is that gnawing by the animals can be stopped by thickening and rounding the plastic edges along slots and other openings. So long as there are no sharp angles for the animal to take its first bite it will make no attempt to start gnawing its way out of the plastic enclosure.

Thirdly, I have found that the animals remain contented even if the plastic floor on which they stand is not flat, but sloping quite steeply toward the center. This makes it possible to put a long slot down the middle of the length of the floor toward which the floor slopes, thereby permitting body wastes to leave the enclosure as soon as they are excreted and eliminating the need for floor litter completely.

I have also discovered a unique way of handling the waste after it falls from the slot in the enclosure abovementioned, which completely eliminates the need for litter changing. If a strip of absorbent material, such as cellulosic building board is placed beneath the slot, it will absorb the urine at once and then quickly permit the water of the urine to evaporate. The cellulosic board, such as Celotex, will remain surprisingly dry at all times due to the prompt evaporation, and because of the lack of moisture resulting from this, the growth of bacteria, which is responsible for the disagreeable odor, is inhibited. The fecal matter also dries quickly and can be simply removed as by sweeping or using a vacuum cleaner once a day or so. The building board need not be changed very frequently; in fact, strips of board which have been in use for over a year still have no disagreeable odor in spite of considerable discoloration.

Finally, I have discovered two ways of watering experimental animals that not only avoid the danger of overflow and the spread of infection inherent in former methods, but also do not increase labor requirements, and, in fact, reduce them. The first of these is by running a closed tube through the animal enclosures, filled with water sufficiently cool to cause condensation of the atmospheric water on the exterior of the tubes. Since tap water usually varies in temperature with the seasons, it is necessary to cool it; I have found that for mice in a typical laboratory room where the temperature is kept constant at 74° F. and the relative humidity at 50%, water in the tube at 54° F. causes the right amount of condensation to meet their needs while avoiding any excess. This varies, of course, with the density of the animal population being watered, as well as the breed of animals. The typical laboratory room referred to had a population of about 2500 mice in a 147 square foot area; it seems surprising that the temperature differential of only 20° between the water of the tube and the ambient air is all that is necessary to supply the water needed by this large number of animals. Because the water condenses in discrete drops at separate locations along the tube, there is virtually no flow along its length, as there is when conventional waterers of the trough type are used. Consequently, transmission of infection through the drinking water is kept to a minimum.

My second method of watering experimental animals is to dispense with water in liquid form entirely, and to feed them an edible aqueous gel such as unsweetened gelatin on a continuous access basis. Such a gel is mainly water, as high as 95 percent, and the small amount of protein in the gelatin is, of course, beneficial. Unsweetened gelatin can be easily made in large amounts and broken into pieces which are then placed where the animals can nibble at them either inside, or more conveniently, on the outside of their cages. Since gelatin does not spoil readily the pieces can be large enough to last a week or more, and it is extremely easy for an inspection of the cages to be made since the size of the pieces remaining each day is apparent at a glance. This method of watering is especially convenient for individual housing, as will be explained in more detail later on.

In the drawings:

FIG. 1 is a fragmentary elevation of the novel apparatus of the invention;

FIG. 2 is a fragmentary top view of the apparatus;

FIG. 3 is a section taken on line 3—3 of FIG. 2 and showing how individual housing enclosures of the present apparatus are constructed and supported;

FIG. 4 is a view, partly in section and partly in elevation taken on the line 4—4 of FIG. 2 and showing housing enclosures and their support; and FIG. 5 is a fragmentary sectional view taken on the line 5—5 of FIG. 2 and showing how the support for the housing enclosures is carried.

Referring to FIGS. 3 and 4, it can be seen that the individual plastic housing enclosure units shown generally at 10 are roughly oblong, their long side walls being shown at 11, their tops at 12, their curved bottoms at 13, and their outer end walls at 14. Outer end walls 14 may be metal or plastic tags with the animals' identification number and other such information, as shown in FIG. 4.

A longitudinal slot 15 runs the length of the curved bottoms 13 bisecting them into equal halves with equal slopes of opposite sign leading from side walls 11 to the slot 15. The inner end of the enclosure, shown generally at 18, consists of an upper open portion 19 defined by sloping edges 20 of the long side walls 11, and an inner end wall 21 terminating in a flange 22. The flange has a flat surface engaging a bottom 24 of supporting member 25. A downward turned tab 26, which is an extension of top 12, extends beyond the line of the sloping edges 20 extended. The side walls 11 may be recessed at their upper inner corners adjacent tab 26, as indicated at 27 when one method of watering is used.

Supporting member 25 is of metal of adequate strength and corrosion resistance such as stainless steel, has a blunted V-shape, and functions as a feed hopper or trough for the animals in the enclosures 10. The blunted portion, or flat hopper bottom 24, is joined to two sides 28 and 29 of equal slopes of opposite sign, which are equal to the slope of the sloping edges 20 of the long side walls 11 of the enclosures 10. Sides 28 and 29 terminate in small vertical rims 31, which are engaged by the tabs 26. Supporting member 25 has a number of parallel slots 30 in its sloping sides 28 and 29 normal to its long axis. These slots, two to each enclosure 10, as shown in FIG. 4, give the animals access to feed, such as dehydrated pellets in the member 25.

As can be seen from FIG. 3, housing enclosure unit 10 may be easily removed from supporting member 25 by a slight rotation around rim 31 as the center until the flange 22 is clear of bottom 24, after which unit 10 may be withdrawn freely. Enclosure units 10 may be replaced by a reverse action, and when so placed make, together with supporting member 25, a plurality of escape-proof experimental animal housing units with a self-feeder in the form of slots 30. The plurality is best shown in FIGS. 1 and 2.

Referring again to FIGS. 3 and 4, further features of the invention will be pointed out. It will be noted that in addition to the single longitudinal slot 15 along the bottom of enclosure unit 10 there are also parallel longitudinal slots 32 and 33 in the top 12 or roof. If the animals are to be watered by the edible gel method above-mentioned, pieces of gel may simply be placed on the roof 12 and the animals can get the water they need by nibbling at the gel through slots 32 and 33. These slots also provide adequate ventilation along with slot 15 in the floor for the animal within enclosure 10.

Slot 15 has the further function of permitting bodily wastes of the animal to leave the enclosure as soon as they are excreted, thereby eliminating the need for litter. A piece of porous building board 34 such as Celotex rests on support 35 immediately beneath the slots 15. It quickly absorbs the urine and then, by reason of its porosity, permits the water of the urine to evaporate so quickly that there is insufficient time for the usual bacterial action to take place, and the offensive odor is eliminated. Also the fecal falls are quickly dried so that they may be easily removed by sweeping, vacuum cleaning, preferably with a crevice tool, and the like.

It will be noted that at slot 15 the bottom 13 has rounded thickened lips 36 which, as explained above, prevent gnawing of the plastic by the animals. It will also be noted that the top 12 at the slots 32 and 33 is rounded.

In case the edible gel watering method is not used, a U-shaped tube 37 is put to use. As shown in FIG. 2, the tube 37 is U-shaped and closely surrounds supporting member 25 on both its long sides 28 and 29 and an end 38. As shown in FIGS. 2 and 3, the tube 37 crosses the housing units 10 at the recesses 27 at the upper inner ends of the housing units. A short distance beyond an end 40 of the supporting member 25, tube 37 is joined by fittings 41 and 42 to flexible hoses 43 and 44, respectively; these in turn lead respectively to outlet 45 and inlet 46 of supply pipe 46a and return pipe 46b. The supply pipe 46a brings a cooled fluid to the tube 37 so that atmospheric water condenses thereon. For example, the ambient temperature may be 74° F., the relative humidity 50%, and the cooled fluid introduced in the tube may be water at 54° F. The condensation on the pipe 37 supplies the animals in the enclosure 10 with their water needs.

As can be seen from FIG. 2, the housing enclosure units can be arranged in a battery shown generally at 47 along both sides of supporting member 25. Ends of the supporting member 25 may be bolted, as shown in FIGS. 1 and 5 to a bracket 48, which is, in turn, bolted to the support 35, which may be a length of channel iron with inwardly directed flanges. The support 35 has an aperture 49 through which passes shaft 50. Hinge member 51, with its shoulder 52, supports support 35, and, in turn, the battery 47 on a collar 51a fixed to the shaft 50. The support 35 is retained on the shaft 50 by a pin 51b. Since in this position the end of the support 35 is practically in contact with the vertical portion of the hinge member 51, the latter and the support 35 move together as the support is pivoted around the shaft 50.

FIG. 1 shows how batteries 47 may be stacked, individually supported by collar 51a fixed to the shaft 50, resting on floor pedestal 52 in a socket 53, and attached to the ceiling 54 by socket 55. Batteries 47 may be swung outwardly one by one around shaft 50 to inspect and otherwise attend to the animals in each battery, and then returned to a position along the wall of the room to conserve space. Another possible arrangement would be to arrange two stacks of batteries in a room in herringbone fashion along the longer walls and with the aisle just wide enough to permit the batteries on one side of the room only to be inspected at the same time. Thus the same aisle space may be utilized for inspecting both stacks of batteries, and the capacity of the room fully utilized.

It is believed that adoption of my method of individual housing, including either one of my two novel watering methods will result in a number of economies and increased reliability of experimental results. Labor requirements for feeding and watering are reduced; those for litter changing completely done away with. If the plastic enclosures of the invention become sufficiently popular that they are made on a mass production basis, it is anticipated that they may be so low in price that they can be discarded after being used once, thus eliminating the expense of cage cleaning, another considerable item of laboratory overhead. Because "social factors" in experiments are eliminated by the individual caging the animals in experiments will give more uniform results and fewer will be needed. Less tangible than these immediate economies, but more important will be the absolute gain in reliability of the results of experiments; all animal experiments are affected to a large extent by the "social factor" and my invention making individual housing feasible on a large scale eliminates this troublesome variable.

It will be understood that the term "translucent" as used in this application will include transparent.

It will be understood that this invention is not to be limited to the details given herein, but that it may be modified within the scope of the appended claims.

What is claimed is:

1. A housing battery for experimental animals comprising a central supporting member having an upstanding rim, a flat bottom and outwardly sloping sides having feeding openings, and a plurality of individual animal translucent plastic enclosures, each enclosure having an extended downturned roof portion adapted to engage said upstanding rim from above, long sides terminating at one end in sloping boundaries having slopes equal to those of said outwardly sloping sides of said supporting member, an opening between said sloping boundaries giving access to said feeding openings, and an extension adapted to come into contact with said bottom from below.

2. A housing battery for experimental animals comprising an elongated metal central supporting member having in cross section an upright blunted V-shape and having a plurality of parallel openings along its sloping sides normal to its length, and a plurality of oblong individual animal translucent plastic enclosures, each enclosure having one end with an open upper part defined by sloping edges of the adjacent long side walls, the degree and length of the slope of said edges of said long side walls being equal to those of the sloping portions of the blunted V of said supporting member, whereby when brought into contact the long axis of the oblong enclosure is normal to the long axis of the supporting member, each said oblong enclosure having a downward-bent tab formed from an extension of the top of the oblong, and an inward projection beneath said open upper part of said one end and said slopes of said long side walls, whereby said enclosure may be placed in firm removable engagement with said supporting member and thereby defining an escape-proof animal housing, slots in the top of each said enclosures for the admission of air, and cut-away portions in said sloping edges of said long side walls, and a U-shaped water-tight tube closely surrounding said supporting member along its long sides and one of its short sides so as to pass through said cut-away portion of said enclosures, a cooling means in communication with said tube with sufficient capacity to cool water within the tube sufficiently to cause condensation of atmospheric water to meet the needs of the housed animals, and strips of absorbent cellulosic building board beneath said plurality of enclosures.

3. The housing of claim 2 where the dimensions of the enclosures are two by three by seven inches.

References Cited in the file of this patent

UNITED STATES PATENTS

| | | |
|---|---|---|
| 2,176,814 | Hawkins | Oct. 17, 1939 |
| 2,197,160 | Schuppner | Apr. 16, 1940 |
| 2,437,210 | Riebli | Mar. 2, 1948 |
| 2,467,525 | Fricke | Apr. 19, 1949 |
| 2,522,198 | Shaw et al. | Sept. 12, 1950 |
| 2,946,309 | Page | July 26, 1960 |
| 2,956,667 | Coulliette et al. | Oct. 18, 1960 |
| 2,963,004 | Pockman et al. | Dec. 6, 1960 |
| 2,971,843 | Templeton | Feb. 14, 1961 |
| 2,988,044 | Adelberg et al. | June 13, 1961 |
| 2,997,022 | Kay | Aug. 22, 1961 |